Oct. 4, 1960  G. COMPAGNARI  2,954,887
SELF-LOADING AND UNLOADING VEHICLE FOR PALLETIZED LOADS
Filed Sept. 24, 1958  3 Sheets-Sheet 1

INVENTOR.
GUY COMPAGNARI
BY C. V. Magonier
ATTORNEY

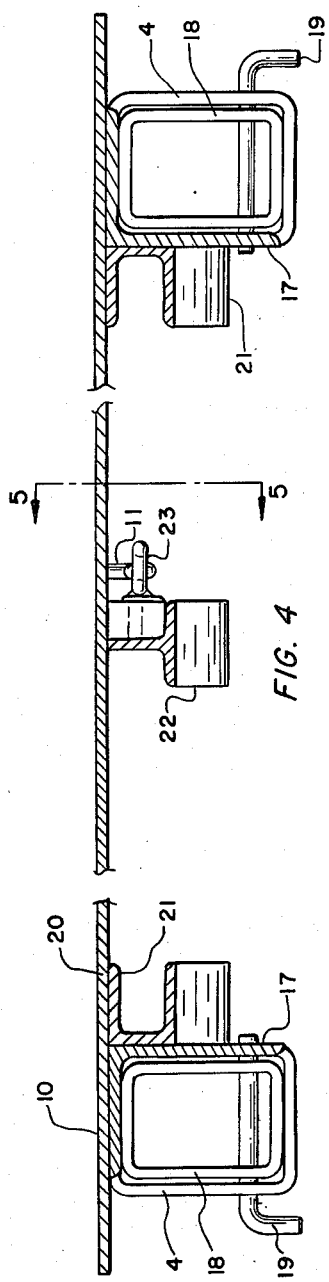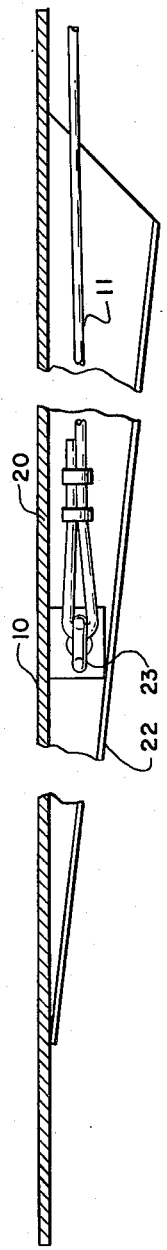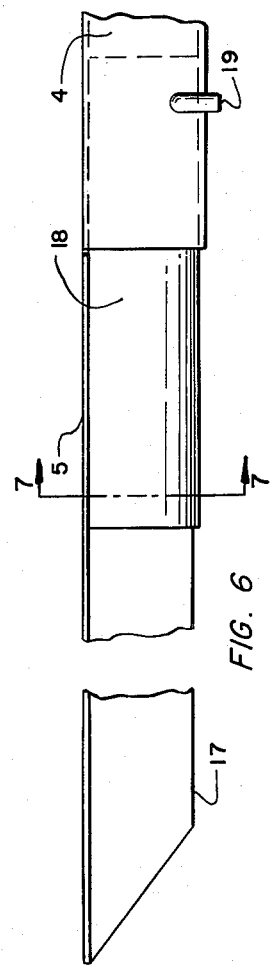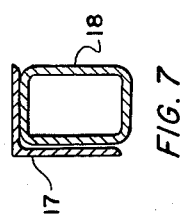

Oct. 4, 1960　　　　　G. COMPAGNARI　　　　2,954,887
SELF-LOADING AND UNLOADING VEHICLE FOR PALLETIZED LOADS
Filed Sept. 24, 1958　　　　　　　　　　　3 Sheets-Sheet 3
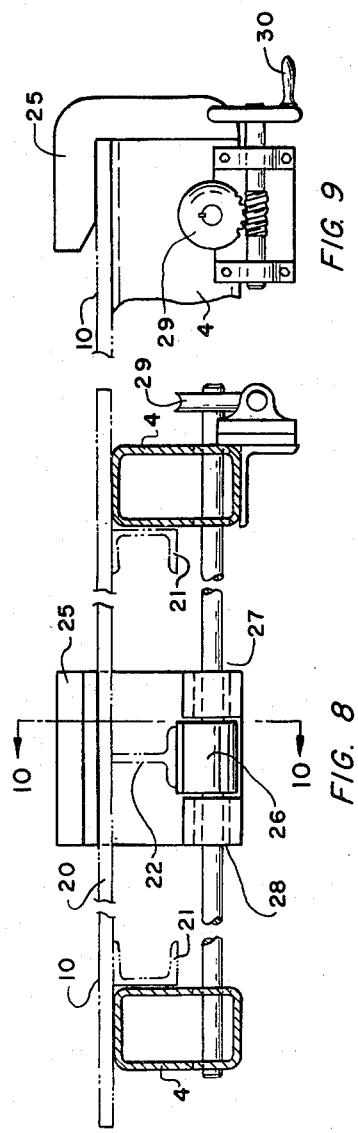
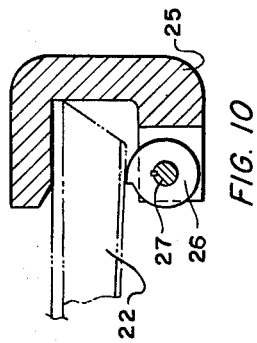
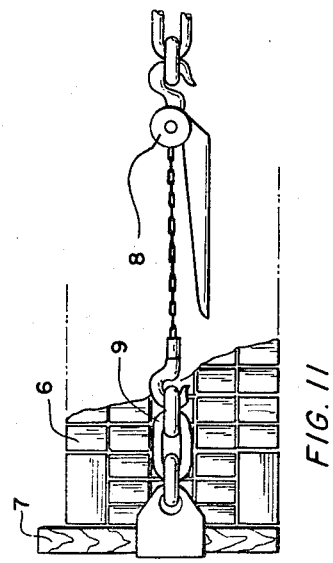
INVENTOR.
GUY COMPAGNARI
BY
ATTORNEY

United States Patent Office 2,954,887
Patented Oct. 4, 1960

2,954,887

SELF-LOADING AND UNLOADING VEHICLE FOR PALLETIZED LOADS

Guy Compagnari, 31751 Brush St., Madison Heights, Mich., assignor of one-half to Ralph S. Johnston, Royal Oak, Mich., Filed Sept. 24, 1958, Ser. No. 763,077

2 Claims. (Cl. 214—505)

This invention relates to a load handling device for a motor truck equipped with a tilting frame mounted on the chassis, and more particularly where the load to be handled comprises such articles as bricks, cement blocks and the like.

Where, as usual, such articles are transported on a flat bed truck body, the common practice heretofore has been to unload the articles manually, with tongs or singly, as fitting to the type of articles to be unloaded. Such method entails the truck to be out of transport service while loading and manually unloading.

Some mechanical and hydraulically operated devices for such articles have been devised and these have been tried out but the initial cost and attendant maintenance of such devices have not been amortized in the overall economic cost savings achieved by such devices.

All of such present devices and methods are unnecessarily costly as will be seen when compared with my invention herein described.

I have discovered, after extensive experimentation and development, that a full load of articles such as bricks, cement blocks, and the like, can be stripped from a specially designed pallet supporting such a load when the articles are held in selectively controlled flexing movement to each other by a specially designed load holding device. The discovery further involves the coupling of features of the said pallet with a cam locking device for holding the pallet and load in position during the tilting cycle of the tilting frame. An additional discovery involves the coupling of features of extension rails used to support the pallet in its descent between the rearward end of the tilted frame and the ground with the feature of raising the rearward ends of the extension rails to a bucking position against the said holding device for the load. This permits the pallet to be stripped from in under the load by cable means on the motor truck chassis with the cable attached to the pallet. All the features incorporated in the above devices lend themselves to a simple inexpensive detachable pallet to selectively co-operate with the features for unloading from the motor truck and for loading when the pallet is detached therefrom.

The general object of the invention is to avoid the disadvantages in the features of the prior and present art and reduce such cost by providing means whereby a motor truck equipped with a tilting frame may be loaded and unloaded rapidly, thus saving the time of loading directly onto the truck and the driver's time of manually unloading the articles singly or in very small groups.

Another object of the invention is to provide a method for unloading articles such as bricks, cement blocks, and the like, held in controlled flexing movement on a detachable pallet.

A further object is to provide a more specific method which contemplates the provision of a load holding device comprising two end retaining plates holding the load longitudinally with two chain pullers and two chains laterally disposed on either side of the load, a detachable pallet comprising a plate and two tapered guides and a tapered center support rigidly affixed under the plate, a cam locking device rigidly affixed to the forward end of the tilting frame and comprising a C frame and a cam operable by a shaft in the lower section of the C frame for locking engagement with the tapered center support under the pallet, two skid rails longitudinally secured laterally in the tilting frame, two removable extension rails adapted to telescopic engagement into the two skid rails and in rearward alignment thereto, and cable means comprising a winch rigidly affixed to the chassis forwardly of the tilting frame, a cable, one end of which is secured windably on the winch, and a hook secured to the other end of the cable. The said specific method comprises the steps of cooperatively holding the articles in the load in controlled flexing movement to each other with the two end retaining plates, firmly attaching the two removable extension rails in rearward alignment with the two skid rails in the frame, slackening the cable a sufficient length to allow for tilting the frame, locking the cam of the cam locking device against the forward portion of the tapered center support, tilting the frame until the rearward end of the two extension rails engage the ground, pulling in the cable taut with the winch to support the load, releasing the cam gradually in the same direction with the tapered center support to place the gravitational pull of the load onto the cable, unwinding the cable from the winch to permit the loaded pallet to slide down the skid and extension rails until the rearward end of the pallet touches the ground while the pallet is being guided between the rails with the tapered guides thereunder, further unwinding the cable an amount slightly in excess of the length of the pallet, driving the motor truck forward until the pallet rests fully on the ground and its forward end is vertically free of the rearward ends of the two extension rails, righting the tilting frame until the rearward ends of the two extension rails are juxtapositioned slightly below the horizontal center of the load, pulling the pallet forward with the winch to position the two extension rails to buck against the front retaining plate and the load until slightly one half the load is stripped onto the ground, driving the motor truck forward pulling the pallet with it until the balance of the load is stripped, and removing the two retaining plates, two chain pullers and chains from the load.

Another object of the invention is to provide a pallet capable of being detached from the motor truck for loading in the yard while the motor truck is otherwise usefully engaged in transporting loads, which pallet is adapted for use as described above.

Another object of the invention is to provide a simple, inexpensive construction of a load handling device for loading and unloading articles such as bricks, cement blocks and the like.

Other objects and advantages will subsequently become apparent which reside in the details of the construction and operation as are more fully hereinafter described and claimed, reference being had to the accompanying drawings forming a part hereof, and in which:

Fig. 4 is a transverse section taken along the line 4—4 of Fig. 1 looking in the direction of the arrows.

Fig. 5 is a full sectional view on a line 5—5 of Fig. 4 looking in the direction of the arrows.

Fig. 6 is an enlarged side elevational view of the extension rail shown in Fig. 2.

Fig. 7 is a transverse section taken along the line 7—7 of Fig. 6 looking in the direction of the arrows.

Figure 1:
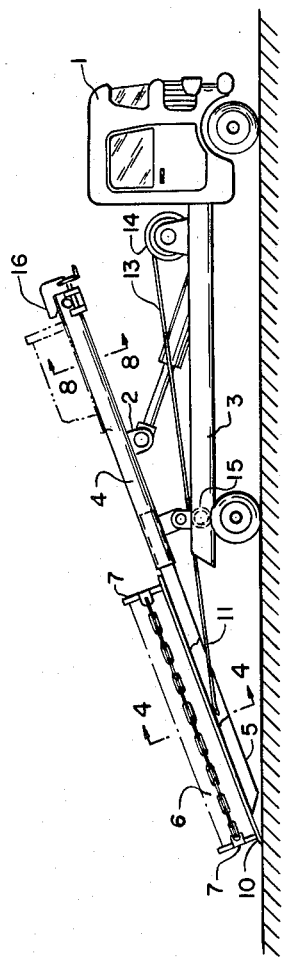
Fig. 1 is a side elevational view of a motor truck with a tilting frame and means for sliding the loaded pallet to the ground.

Fig. 8 is a transverse view taken along the line 8—8 of Fig. 1 looking in the direction of the arrows and showing the cam locking device, and the pallet in position in phantom.

Fig. 9 is a fragmentary side elevational view of Fig. 8 and showing the pallet in position in phantom.

Fig. 10 is a fragmentary vertical section taken along the line 10—10 in Fig. 8 looking in the direction of the arrows.

Figure 2:
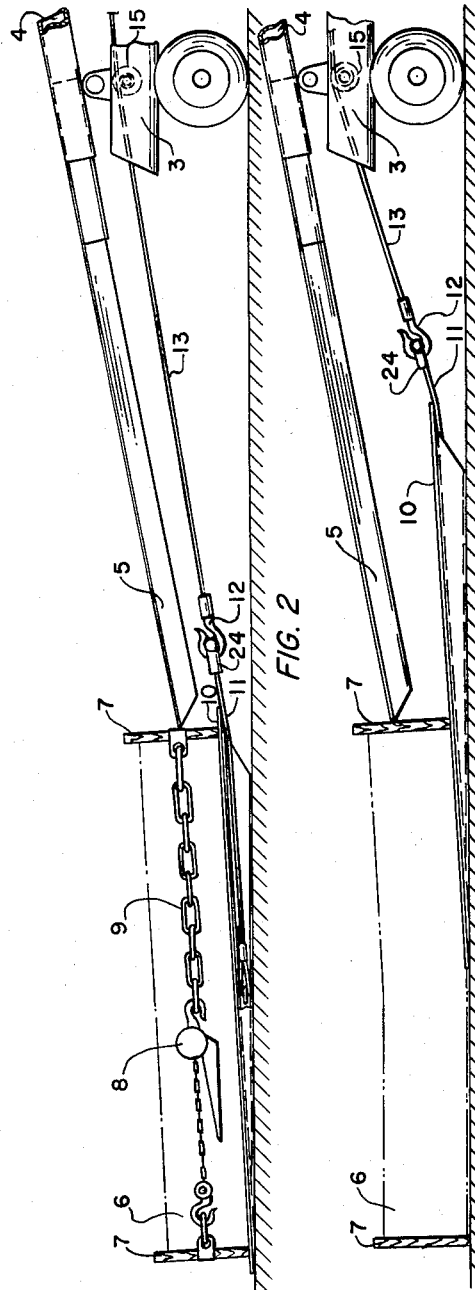
Fig. 2 is a fragmentary side elevational view of the unloading device and means for stripping the load onto the ground.

Fig. 11 is an enlarged fragmentary side elevational view of the rearward section of the load as viewed in Fig. 2 showing the retaining plate and chain puller.

Figure 3:
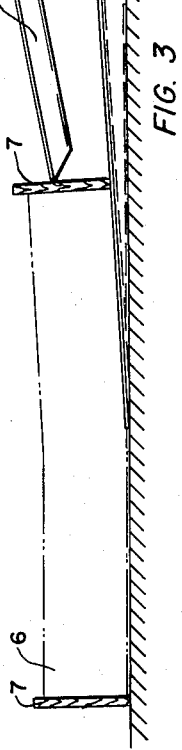
Fig. 3 is a fragmentary side elevational view of the unloading device showing the load partially stripped onto the ground.

Referring to the drawings in detail and more particularly first to Figs. 1–3 thereof, I have illustrated a conventional motor truck 1, with a tilting frame, generally designated 2, mounted on a chassis 3, of the motor truck.

My improved unloading device comprises two skid rails 4, forming a portion of the tilting frame, two extension rails, generally designated 5, adapted to be removably attached to the skid rails, a load 6 of bricks and the like being selectively held in controlled flexing movement by a load holding device comprising two end retaining plates 7, longitudinally positioned on either end of the load and held together by two chain pullers 8 and two chains 9, laterally disposed on either side of the load, and the load and load holding device slidably supported on a pallet, generally designated 10. The pallet is provided with a hitch 11, to which a hook 12, on the cable 13, is detachably connected to said hitch. The opposite end of the cable is wound around a winch 14, rigidly affixed to the chassis, and an idle pulley 15, is provided on the chassis to prevent the cable from dragging on the chassis portions. A cam locking device, generally designated 16, is rigidly affixed to the tilting frame for retaining the load during the tilting cycle.

Referring to Figs. 4–7, it will be seen that the pallet 10 is slidably mounted longitudinally of the motor truck on the skid rails and the extension rails.

From inspection of Figs. 6–7 it will be seen that the extension rails are preferably shown as a weldment of an elongated angular section 17, with a short rectangular tubular section 18. The rectangular tubular section extending forwardly beyond the angular section is provided for telescopic engagement into the rearward end of the skid rails. It is further shown that the top surfaces of the angle sections are in alignment with the top surfaces of the skid rails. The alignment of the inward surfaces of the angle sections and skid rails is shown in Fig. 4.

The removable extension rails are held in position during the loading and unloading cycle by a retaining pin 19.

In Figs. 4–5, it is seen that the pallet, generally designated 10, is preferably shown as a weldment of a flat plate 20, with two longitudinally disposed tapered guides 21, of channel type cross-section, and a longitunidally disposed tapered center support 22, of I-beam type cross-section. It is also shown that tapered guides and center support leave a substantial portion of the flat plate unsupported at the rearward end for flexing of the flat plate during the stripping of the load. It is also shown that the guides and center support have a very slowly rising taper increasing forwardly under the plate to permit the pallet to be supported on the ground so that the plate is in close approximation to a horizontal plane to minimize the flexing of the load to be stripped. A hitch 11, is shown attached thru an eye-bolt 23, positioned substantially in the center portion of the tapered center support and provided with a loop 24, on its free end.

From the above construction it is readily seen that the pallet is detachable from the motor truck and adapted to slide freely longitudinally on the top surfaces of the skid rails and the extension rails and be guided substantially against lateral movement between the skid rails and the extension rails by the channel sectioned tapered guides.

In Fig. 1, the cam locking device, generally designated 16, is shown mounted in position on the forward end of the skid rails 4, which rails form a portion of the tilting frame 2.

From an inspection of Figs. 8–10 it will be seen that the cam locking device, preferably shown, comprises a C-sectioned member 25, mounted to the forward ends of the skid rails 4, mounting not shown. A cam 26, keyed to a cam shaft 27, and the cam shaft suitably supported in bearings and particularly in the cam shaft bearings 28, shown in the lower portion of the C-sectioned member. A worm gear control, generally designated 29, suitably affixed to the cam shaft and operated by a wheel handle 30. The pallet, generally designated 10, is shown in phantom being secured in locked position between the top portion of the C-sectioned member and the cam 26 releasably secured against the bottom surface of the tapered center support 22 of the pallet.

It will be understood as shown in Fig. 10 that a counter-clockwise movement of the cam with its uniform progressively formed face will release the loaded pallet onto the cable during the unloading cycle by the cam face moving in the same direction with the tapered center support of the pallet.

As best shown in Fig. 11, the load 6, using bricks for this example, are viewed being held in selectively controlled flexing movement by the two end retaining plates 7, only the rear plate being shown, and the said retaining plates being held together on either side with a chain puller 8, and a chain 9, longitudinally disposed to the load.

What I claim is:

1. In a self-unloading motor vehicle for bricks and the like having a tilting frame with extensions and a winch controlled cable, the combination with a pallet, flexible load holding means, and a cam releasing means, said pallet releasably affixed to said cable and having a top plate adapted to flex at its rearward end and a tapered center support rigidly affixed thereunder and extending slightly taperedly forward from said flexing portion of the plate, said load holding means having a pair of end plates slidably disposed transversely on said pallet and adapted to be held together at their mid-point in vertical flexing movement, one end plate at the forward end and the other end plate at the rearward end of said load, said cam releasing means affixed to said tilting frame and having a C frame with its upper portion adapted to engage the top of the plate of said pallet and a uniform progressively faced cam journaled in the bottom portion of the C frame and cooperatively engaged against the bottom of the tapered center support of said pallet for releasing said pallet onto the said cable.

2. In a self-unloading motor vehicle for bricks and the like having a tilting frame with extensions and a winch controlled cable, the combination with a pallet and a flexible load holding means, said pallet removably affixed to said cable and having a top plate adapted to flex at its rearward end and a pair of tapered supporting members rigidly affixed thereunder and extending slightly taperedly forward from said flexing portion of the plate, said load holding means having a pair of end plates slidably disposed transversely on said pallet and adapted to be held together slightly loose at their mid-points, one end plate at the forward end and the other end plate at the rearward end of said load.

References Cited in the file of this patent

UNITED STATES PATENTS

| | | |
|---|---|---|
| 990,517 | Blodgett | Apr. 25, 1911 |
| 1,148,531 | Oldham | Aug. 3, 1915 |
| 1,455,821 | Swanson | May 22, 1923 |
| 2,421,128 | Pride | May 27, 1947 |
| 2,508,740 | Alvare | May 23, 1950 |
| 2,745,566 | Bouffard | May 15, 1956 |